(12) United States Patent
Bekkerman et al.

(10) Patent No.: US 8,099,453 B2
(45) Date of Patent: Jan. 17, 2012

(54) SYSTEM AND METHOD FOR DATA CLUSTERING

(75) Inventors: Ron Bekkerman, Palo Alto, CA (US); Martin B. Scholz, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 12/357,668

(22) Filed: Jan. 22, 2009

(65) Prior Publication Data

US 2010/0185695 A1 Jul. 22, 2010

(51) Int. Cl.
*G06F 15/16* (2006.01)

(52) U.S. Cl. ......................................... 709/201; 709/208

(58) Field of Classification Search .......... 709/201–203, 709/205, 208, 215, 216, 224; 707/623, 737, 707/776, 802; 718/106; 711/173
See application file for complete search history.

(56) References Cited

U.S. PATENT DOCUMENTS

| | | | | |
|---|---|---|---|---|
| 5,202,998 A * | 4/1993 | Yanes | ............................ | 710/267 |
| 6,092,072 A * | 7/2000 | Guha et al. | ..................... | 707/700 |
| 6,269,376 B1 * | 7/2001 | Dhillon et al. | ................ | 707/613 |
| 6,303,297 B1 * | 10/2001 | Lincoln et al. | ..................... | 435/6 |
| 6,633,863 B1 * | 10/2003 | Sørensen Møller et al. | .......... | 1/1 |
| 6,839,680 B1 | 1/2005 | Liu et al. | | |
| 7,024,049 B2 * | 4/2006 | Bern et al. | ..................... | 382/254 |
| 7,197,504 B1 * | 3/2007 | Runkler et al. | ........................ | 1/1 |
| 7,308,451 B1 * | 12/2007 | Lamping et al. | .............. | 707/737 |
| 7,353,359 B2 * | 4/2008 | Kalafala et al. | ................ | 711/173 |
| 7,379,890 B2 * | 5/2008 | Myr et al. | ........................ | 705/10 |
| 7,383,258 B2 * | 6/2008 | Harik et al. | ............................ | 1/1 |
| 7,386,522 B1 * | 6/2008 | Bigus et al. | ...................... | 706/15 |
| 7,395,235 B2 * | 7/2008 | Dhurandhar et al. | ........ | 705/36 R |
| 7,577,091 B2 * | 8/2009 | Antal et al. | .................... | 370/229 |
| 7,706,617 B2 * | 4/2010 | Cahill et al. | .................. | 382/224 |
| 7,707,148 B1 * | 4/2010 | Fogel | ..................... | 707/999.007 |
| 7,743,058 B2 * | 6/2010 | Liu et al. | ........................ | 707/737 |
| 7,761,514 B2 * | 7/2010 | Popescu et al. | ............... | 709/205 |
| 7,769,803 B2 * | 8/2010 | Birdwell et al. | ............... | 709/201 |
| 7,801,836 B2 * | 9/2010 | Sureka | ............................ | 706/13 |
| 7,818,272 B1 * | 10/2010 | Mishra et al. | .................... | 706/14 |
| 7,890,445 B2 * | 2/2011 | Ben Hur et al. | .................. | 706/45 |
| 2003/0101449 A1 | 5/2003 | Bentolila et al. | | |
| 2005/0071140 A1 * | 3/2005 | Ben-Hur et al. | ................. | 703/11 |
| 2006/0112049 A1 * | 5/2006 | Mehrotra et al. | ............... | 706/46 |
| 2007/0005292 A1 * | 1/2007 | Jin | ................ | 702/150 |
| 2007/0198553 A1 * | 8/2007 | Wolman | ........................ | 707/100 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002.

(Continued)

*Primary Examiner* — Andrew Caldwell
*Assistant Examiner* — Melvin H Pollack

(57) ABSTRACT

A method for data clustering may comprise entering data into a computer network comprising a master processor, an array of slave processors, and two cluster seats associated with each slave processor; executing a master process comprising dividing the data into clusters, sending the clusters to the cluster seats, initializing an optimization cycle, and computing an objective function. The optimization cycle includes the parallel execution by the slave processors of a slave process, which includes exchanging data between paired clusters so as to increase the objective function based on two modalities, and then resorting the cluster pairs for a subsequent iteration of the process.

17 Claims, 3 Drawing Sheets

U.S. PATENT DOCUMENTS

| | | | |
|---|---|---|---|
| 2007/0208677 A1* | 9/2007 | Goldberg et al. | 706/13 |
| 2008/0114750 A1* | 5/2008 | Saxena et al. | 707/5 |
| 2008/0126176 A1 | 5/2008 | Iguchi | |
| 2008/0168061 A1 | 7/2008 | Liu et al. | |
| 2008/0294686 A1 | 11/2008 | Long et al. | |

OTHER PUBLICATIONS

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/ 2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda An Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Bekkerman et al., Data Weaving: Scaling Up the State-of-the-Art in Data Clustering, CIKM '08, Oct. 26-30, 2008, Napa Valley, CA.

* cited by examiner

SYSTEM AND METHOD FOR DATA CLUSTERING

BACKGROUND

The challenge of data clustering—constructing semantically meaningful groups of data instances—has been a focus of information technology (IT) field for some time. Accordingly, a number of methods for data clustering have been developed. One dilemma surrounding existing methods is based on a tradeoff between effectiveness and efficiency or scalability. The enormous amount and dimensionality of data processed by modern data mining tools call for effective and scalable unsupervised learning techniques. However, most clustering algorithms in the art are either effective or scalable, but not both. In other words, these methods either provide fairly powerful learning capabilities but are too resource-intensive for large or highly dimensional datasets, or they are useable on large datasets but produce low-quality results.

Modern resources for generation, accumulation, and storage of data have made giga- and terabyte datasets more and more common. Due to the magnitude of such tasks, as well as the time and processing power that they can consume, data mining practitioners often tend to use simpler methods in the interest of feasibility. However, such an approach sacrifices mining power and may provide unsatisfactory results. Furthermore, for very large and/or complex amounts of data, even simple methods may not be feasible. If one considers, for example, a problem of clustering one million data instances using a simple online clustering algorithm: first initialize n clusters with one data point each, then iteratively assign the rest of points into their closest clusters (in the Euclidean space). Even for small values of n (e.g. n=1000), such an algorithm may work for hours on a modern personal computer (PC). The results would however be quite unsatisfactory, especially if the data points are 100,000-dimensional vectors.

Therefore, a number of IT fields could benefit from methods and systems of data clustering that combine a powerful learning algorithm with a scalability that addresses modern dataset demands.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1:
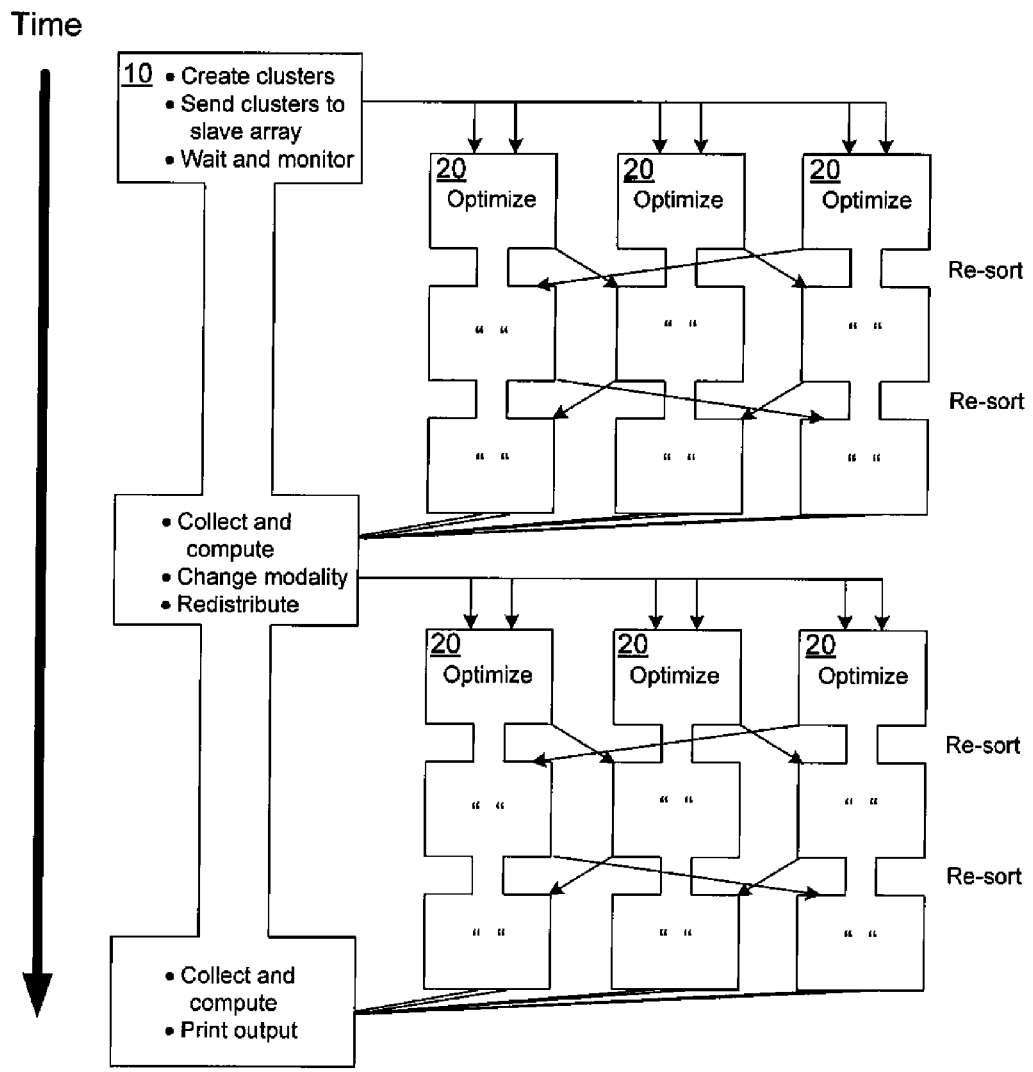
FIG. 1 is a schematic summary of a data clustering algorithm in accordance with an embodiment of the present invention.

Reference will now be made to the exemplary embodiments illustrated, and specific language will be used herein to describe the same. The present disclosure sets forth a method and system by which multi-modal data clustering may be accomplished while utilizing more powerful clustering algorithms in a readily scalable method. Parallel processing methods provide one approach to providing scalability. However, despite the long-held interest in data clustering in the data mining community, not many clustering algorithms have been parallelized, and not many software tools for parallel clustering have been built, and of these most are fairly simple. In contrast, there are two families of data clustering methods that are widely considered as very powerful: multi-modal clustering and information-theoretic clustering (ITC).

Multi-modal (or multivariate) clustering is a framework for simultaneously clustering a few types, or modalities, of data. As used herein "modality" may refer to a collection of data points that may be clustered based on a shared type. One example of a multi-modal clustering task would be to construct a clustering of Web pages, together with a clustering of words from those pages, as well as a clustering of URLs hyperlinked from those pages. It is commonly believed that multi-modal clustering is able to achieve better results than traditional, uni-modal methods. Of the multi-modal approaches, the two-modal case (often called "co-clustering" or "double clustering") can be of particular interest.

Information-theoretic clustering (ITC) is an adequate solution to clustering highly multi-dimensional data, such as documents or genes. ITC methods perform global optimization of an information-theoretic objective function. Many global optimization methods are essentially sequential and therefore hard to parallelize. In contrast, local optimization methods may be more easily parallelizable. However, many known local optimization methods are not useful for multi-dimensional datasets.

One principle of ITC is known in the art as the Information Bottleneck (IB), in which a random variable X is clustered with respect to an interacting variable Y: the clustering $\tilde{X}$ is represented as a low-bandwidth channel (i.e. a bottleneck) between the input signal X and the output signal Y. This channel is constructed to minimize the communication error while maximizing the compression:

$$\max[I(\tilde{X};Y) - \beta I(\tilde{X};X)], \quad \text{(Equation 1)}$$

where I is a mutual information (MI) and $\beta$ is a Lagrange multiplier. The IB principle can be generalized to a multivariate case. In a simple form, for clustering two variables, X and Y, a channel $X \leftrightarrow \tilde{X} \leftrightarrow \tilde{Y} \leftrightarrow Y$ is constructed to optimize the objective $$\max[I(\tilde{X};\tilde{Y}) - \beta_1 I(\tilde{X};X) - \beta I(\tilde{Y};Y)]. \quad \text{(Equation 2)}$$

When more than two variables are clustered, the mutual information $I(\tilde{X};\tilde{Y})$ is generalized into its multivariate version, called multi-information. The complexity of computing multi-information grows exponentially as more variables are added, and can therefore be restrictive in practical cases even for only three variables.

Information-theoretic co-clustering (IT-CC) can be an alternative to multivariate IB for the two-variate case when the numbers of clusters $|\tilde{X}|$ and $|\tilde{Y}|$ are fixed. In this case, one may drop the compression constraints $I(\tilde{X};X)$ and $I(\tilde{Y};Y)$ in Equation 2 and directly minimize the information loss:

$$\min[I(X;Y) - I(\tilde{X};\tilde{Y})] = \max I(\tilde{X};\tilde{Y}), \quad \text{(Equation 3)}$$

when I(X;Y) is constant for a given dataset.

As discussed above, ITC methods work through global optimization and may be difficult to parallelize. Co-clustering (CC) methods like IT-CC can also provide an alternative to this problem, utilizing the approach of breaking down a global optimization task into a set of local optimizations which may be done in parallel. Embodiments of the present invention provide a further benefit through a parallelization scheme that incorporates a co-clustering method that, like IT-CC, provides a local optimization approach, while being more aggressive in optimizing an objective function.

A general embodiment of the present invention includes a method for data clustering. This method can comprise entering the data into a computer network that is configured for parallel processing of the components of an objective function. Such a network may include a master processor and an array of slave processors.

An algorithm for optimizing a uni-modal objective function, such as Equation 1 according to the IB principle, may use the procedure of: (a) as an initialization step, assigning all data points in a dataset into clusters; (b) constructing a random permutation of all the data points in which each is pulled out of its cluster and iteratively assigned to another cluster; and (c) leaving the data point in the cluster such that the objective function is maximized. A multi-modal algorithm in accordance with embodiments of the present invention can further iterate over data modalities expressed in a dataset, applying the above optimization procedure at each iteration in order to optimize a co-clustering objective function such as Equation 3. The algorithm improves clustering by continuously updating cluster memberships and exchanging data between clusters where needed. To decide whether to change a cluster membership, the algorithm directly evaluates the objective.

In a particular embodiment of the data clustering method, the method can comprise entering data into a computer network as described above, in which a master processor executing a master process prepares the data by dividing it into clusters. The clusters may then be sent to the array of slave processors for execution of an optimization procedure such as described above. To accommodate the pairwise treatment of clusters, each slave processor in the computer network may have two locations or seats associated therewith for holding a pair of clusters during an optimization step.

Parallelization of this co-clustering algorithm is allowed based on the consideration that its objective function $I(\tilde{X};\tilde{Y})$ has the additive property over either of its arguments. That is, in each decision whether to move data point $x \in \tilde{x}$ to cluster $\tilde{x}^*$, only the portion of the function that corresponds to clusters $\tilde{x}$ and $\tilde{x}^*$ is affected. Indeed, by definition:

$$I(\tilde{X};\tilde{Y}) = \sum_{\tilde{x} \in \tilde{X}} \sum_{\tilde{y} \in \tilde{Y}} p(\tilde{x},\tilde{y}) \log \frac{p(\tilde{x},\tilde{y})}{p(\tilde{x})p(\tilde{y})}. \quad \text{(Equation 4)}$$

where $\tilde{x}$ and $\tilde{y}$ are the corresponding clusters of x and y, respectively, $p(\tilde{x},\tilde{y})$ is a joint probability distribution and $p(\tilde{x})$ and $p(\tilde{y})$ are marginal probability distributions of these clusters.

To check whether such a move increases the objective function, it is sufficient to calculate the delta between its value before the move and after the move. Similarly, only the portion of the function corresponding to the clusters in question are involved and all other terms cancel out. So for clusters $\tilde{x}$ and $\tilde{x}^*$:

$$\Delta I(\tilde{X};\tilde{Y}) = I_{after}(\tilde{X};\tilde{Y}) - I_{before}(\tilde{X};\tilde{Y}) = \quad \text{(Equation 5)}$$

$$\sum_{\tilde{y}} \left[ p(\tilde{x} \backslash \{x\}, \tilde{y}) \log \frac{p(\tilde{x} \backslash \{x\}, \tilde{y})}{p(\tilde{x} \backslash \{x\})} + \right.$$

-continued $$p(\tilde{x}^* \cup \{x\}, \tilde{y}) \log \frac{p(\tilde{x}^* \cup \{x\}, \tilde{y})}{p(\tilde{x}^* \cup \{x\})} -$$

$$\left. p(\tilde{x}, \tilde{y}) \log \frac{p(\tilde{x}, \tilde{y})}{p(\tilde{x})} - p(\tilde{x}^*, \tilde{y}) \log \frac{p(\tilde{x}^*, \tilde{y})}{p(\tilde{x}^*)} \right].$$

By splitting all clusters of $\tilde{X}$ into disjoint pairs, probing the moves $x \rightarrow \tilde{x}^*$ can be performed in parallel.

Each probing of moves can be then executed using a separate processor, after which the processors can exchange their data. Since the communication is generally expensive, it is beneficial to test all elements of both clusters in a pair. If the probe shows that the objective can be increased, the element is immediately moved from its cluster into another. Using this approach, data points do not necessarily move into the cluster such that the objective function is maximized, but only increased. While such a loss might look crucial, it has been found that both approaches are comparably effective as soon as the number of optimization steps is about the same. The latter can be achieved by iterating over all the cluster pairs.

In view of this, treatment of the clustered data can comprise a master process executed by the master processor and slave process to be executed in parallel by the slave processors. A schematic summary of an exemplary embodiment of the algorithm is shown in FIG. 1. The master processor executes the master process 10, which can comprise the initial clustering of data and sending the clusters to the slave processors each executing the slave process 20 as discussed above. After constructing the initial set of cluster pairs (e.g. by sending them to the logically paired cluster seats), the master process can also include initializing an optimization cycle in the slave processors and then waiting for the cycle to complete. The master process can further include monitoring the progress of the optimization cycle so that, in the event of a failure in the cycle's execution, the master process can reinitialize the slave process.

The optimization cycle includes parallel execution of the slave process. In general, the slave process as executed by each slave processor comprises two basic tasks: adjusting membership of the pair of clusters in the seats associated with that processor, and participating in resorting the cluster pairs in the array so that the next optimization step can be executed on pairs that are different from those in the prior step.

As discussed above, the step of adjusting membership of the clusters can involve exchanging data as needed to locally increase the objective function based on two modalities present in the data. This is done by iteratively moving data points between the clusters while evaluating the delta, such as expressed in Equation 5. It should be noted that, while the process involves exchanging data and probing the effect of each move, some iterations of this process will result in fewer data moves than others, and it is conceivable that the iteration may call for no changes in cluster membership.

Figure 2:
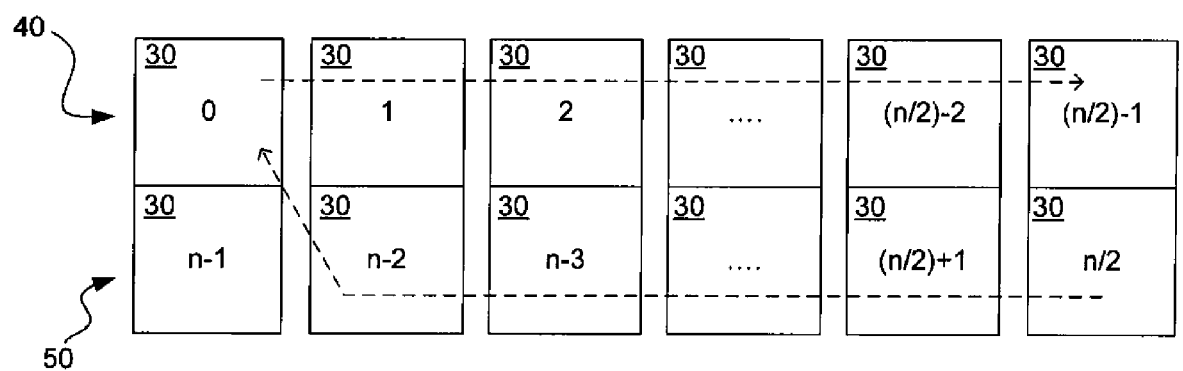
FIG. 2 is a schematic diagram of cluster seat arrangement and resorting protocol in accordance with an embodiment of the present invention.

The other step of the slave process accomplishes the resorting of cluster pairs so that new pairs may be subjected to the optimization step. Accordingly, after each slave processor has completed its optimization step, it is ready to send and receive clusters to and from other slave processors. To do this, it is enough for each slave processor to send only one cluster of each pair to another slave processor. This way, the communication cost of the optimization cycle may be minimized. The resorting step allows executing of the slave process on a plurality of possible cluster pairs during the course of an optimization cycle. In one embodiment, a deterministic protocol may be employed so that all possible cluster pairs are created during the cycle. In a particular embodiment, such a protocol involves a protocol illustrated in FIG. 2. In the case where there are n clusters and n is an even number, the array used will have n/2 slave processors. As each slave processor holds two clusters at each time point, the cluster seats 30 can be organized into two logical rows: an upper row 40 and a lower row 50, and the seats may be numbered cyclically from 1 to n with the upper row numbers also defining the processor numbers.

The general movement of clusters through the array is indicated by dashed arrows. The protocol alternates sending the clusters in the upper row to the right, (with periodic boundary conditions in effect) and sending the clusters in the lower row to the left. Processor number 0 is an exception in that it always keeps the cluster in seat n in place, and therefore always sends the other cluster. This processor thereby inverts the direction in which a cluster is moving and therefore insures that all possible pairs are created. To clarify the order, referring again to the exemplary array in FIG. 2, in a case where n is even, a cluster starting from seat 0 would follow the sequence 1, 1, 2, 2, . . . , (n/2)−2, (n/2)−2, (n/2)−1, (n/2)−1, n/2, n/2, (n/2)+1, (n/2)+1, . . . , n−3, n−3, n−2, n−2, 0. In the case where n is odd, the seat labeled n is kept unoccupied.

In one embodiment, this protocol also insures that every pair of clusters meets exactly once. Two clusters meet at a processor if the sum of their seat numbers modulo (n−1) is 0. Every two iterations thereafter, the new seat number of every cluster will increase by 1 modulo (n−1). The sum will hence increase by 2 every two iterations. Similarly, if the sum of seat numbers modulo (n−1) is (n−2), then the clusters will meet in the next iteration. It can be seen that by adding 2 modulo (n−1) it takes at most (n−1) iterations until any two regular clusters (without the stationary one) meet, and every cluster will hit processor 0 and meet the stationary cluster from either seat (n/2)−1 or (n−2) when moving in the same direction for (n−1) iterations.

In another embodiment, the resorting may be done by having each slave processor send a cluster to another slave processor at random. This sending, while essentially random, may be done in a way so that every cluster seat remains occupied by a cluster, so as to avoid idle processors due to incomplete pairing. This stochastic protocol avoids the situation where an initial ordering of clusters may be disadvantageous is preserved through the optimization cycle. However, the stochastic protocol does not provide the guarantee of completeness provided by the deterministic protocol.

After completion of the optimization cycle, the master process may terminate its wait state and then compute the whole objective function based on the new clustering accomplished during the optimization cycle. As discussed above, the basic algorithm may be applied to multi-modal tasks by iterating the algorithm over modalities. Accordingly, in a particular embodiment of the present invention, the master process may be repeated for one or more iterations with different combinations of modalities for each iteration. In a more specific embodiment, at least one different modality is utilized for each iteration.

By breaking down a global optimization task into a set of local optimizations and parallelizing them, the embodiments of the present invention provide a clustering method that is both powerful and highly scalable. As such, it can accommodate datasets that are very large. In a particular embodiment, the method may be used for clustering from hundreds of thousands to millions of data instances, though this range is not intended to be limiting. In a more specific aspect, the method may involve from 3 to 1,000,000 clusters.

The present disclosure also sets forth a system configured for executing the processes described herein. The system can comprise a master processor, an array of slave processors, and two cluster seats associated with each slave processor. It should be understood that each processor may be separately packaged units (e.g. chips) or may instead be an individual processing unit housed on one die with other such units, as in multi-core processor chips. Also, virtual processors may constitute processors in accordance with the present invention, where said virtual processors are logical processing units embodied in a physical processor. As such, each physical processor may provide multiple processors, thereby further increasing the size of the network beyond the number of physical processors that may be available. Furthermore, the master and slave processors may be platformed and connected by any means known in the art that provide the communication speed and bandwidth appropriate for the application at hand. The parallel setup and modular nature of the system and the algorithm mean that the system can be scaled up to match the data task. As such, the slave processor array may include up to 1000 separate processors, or even many more.

The present disclosure further sets forth program code for executing the algorithms described herein, where said program code may be embodied on a computer-readable medium and therefore read by and executed on a machine. In a particular embodiment, the machine or system may be a computer network comprising a master processor, an array of slave processors, and two cluster seats associated with each slave processor. In another particular embodiment, the program code comprises a section of master process code for execution by the master processor, and a section of slave process code for execution by each slave processor.

EXAMPLES

Example 1

In an exemplary implementation of the algorithm of the present invention, the communication was based on the Massage Passing Interface (MPI). The algorithm was deployed on a Hewlett Packard XC Linux cluster system consisting of 62 eight-core machines with 16 GB of RAM each.

A parallelized algorithm in accordance with the present invention ("DataLoom") was compared to a sequential co-clustering method (SCC). As a baseline, a parallelized IT-CC algorithm was used. For simplicity, two datasets having an even number of categories were chosen. One (sanders-r) was a small collection of 1188 email messages, grouped into 30 folders. The other was the 20 Newsgroups (20NG) dataset, consisting of 19,997 postings submitted to 20 newsgroups. About 4.5% of the 20NG documents are duplications, but these were not removed for better replicability. For all four of the datasets, documents and their words were simultaneously clustered. For the email datasets, the third modality—names of email correspondents—was also clustered. For this 3-way clustering, a Clique-wise optimization scheme was used. The measure of clustering performance used was a micro-averaged accuracy measure. The results are summarized in Table 1.

TABLE 1

Mean (±SE) clustering accuracy on small datasets.

| Dataset | IT-CC | Sequential Co-Clustering | DataLoom 2-way deterministic | DataLoom 2-way stochastic | DataLoom 3-way stochastic |
|---|---|---|---|---|---|
| sanders-r | 56.1 ± 0.7 | 60.2 ± 0.4 | 59.8 ± 0.9 | 61.3 ± 0.8 | 66.5 ± 0.2 |
| 20NG | 54.2 ± 0.7 | 57.7 ± 0.2 | 55.1 ± 0.7 | 55.6 ± 0.7 | N/A |

The results show that sequential co-clustering greatly outperforms IT-CC, and the algorithms of the present invention demonstrate comparable performance to the powerful SCC.

Example 2

The RCV1 dataset consists of 806,791 documents each of which belongs to a hierarchy of categories: the top level contains four categories, and the second level contains 55 categories. In this experiment, the top level was ignored and categories from all the lower levels were mapped onto their parents from the second level (using this scheme, 27076 documents were not assigned to any category and therefore were always considered as wrongly categorized). Stopwords and low frequency words were removed, leaving 150,032 distinct words overall. Represented as a contingency table, the resulting data contained over 120 billion entries.

Figure 3:
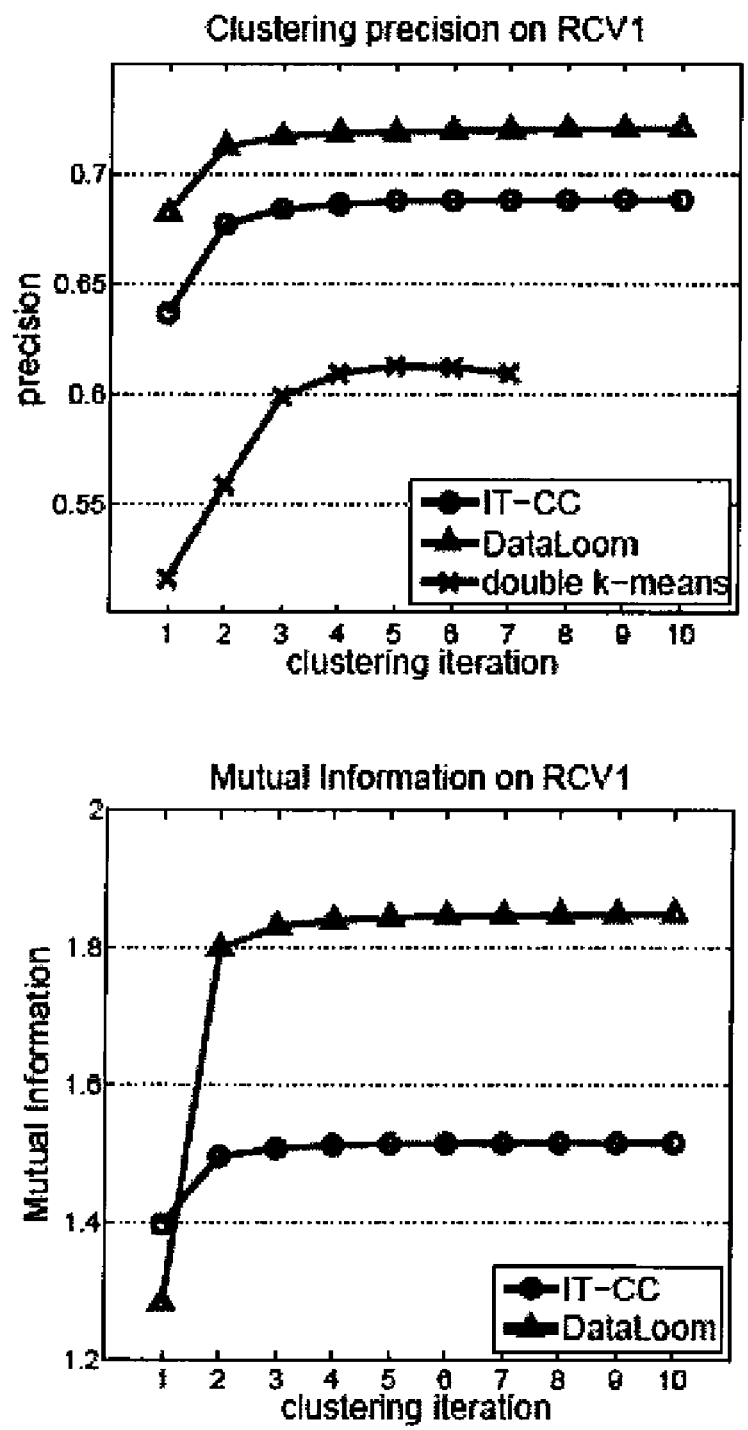
FIG. 3 shows a graph of the clustering accuracy and mutual information on a large dataset for a data clustering algorithm in accordance with an embodiment of the present invention as compared to other protocols.

As an initial step, 800 document clusters and 800 word clusters were built. The clustering precision measure of Example 1 was used. The results of this system ("DataLoom") compared with parallelized IT-CC and parallelized double k-means is plotted in FIG. 3. DataLoom showed a clear advantage over the other methods. The mutual information $I(\tilde{X};\tilde{Y})$ was also plotted after each iteration, and showed that DataLoom was able to construct clusterings with 20% higher mutual information.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for data clustering, comprising:
a) providing data in a computer network, said data having a plurality of modalities expressed therein and said network comprising a master processor, an array of slave processors, and two cluster seats associated with each slave processor;
b) executing a master process with the master processor, said master process comprising:
  i) dividing the data into clusters;
  ii) sending each cluster to one of the slave processors, so that each slave processor holds a cluster pair;
  iii) initializing an optimization cycle, including parallel execution by the slave processors of a slave process comprising exchanging data between clusters in each cluster pair so as to increase an objective function based on two modalities;
  iv) re-sorting the cluster pairs, wherein a cluster of at least one of the cluster pairs is passed to another cluster seat at random or in sequence, and wherein the slave process is repeated for a plurality of possible cluster pairs; and
  v) computing the objective function.

2. The method of claim 1, wherein the resorting comprises sending one of the clusters of each cluster pair to a cluster seat associated with another slave processor in a sequence.

3. The method of claim 1, wherein all possible cluster pairs are created during the optimization cycle.

4. The method of claim 1, wherein one cluster of the cluster pair is passed to another cluster seat at random while insuring that all cluster seats remain occupied by clusters.

5. The method of claim 1, wherein the step of executing the master process is repeated for one or more iterations, and at least one different modality is used by the slave process in each iteration.

6. The method of claim 1, wherein the master process further comprises monitoring the optimization cycle and restarting the optimization cycle in the event of a failure.

7. The method of claim 1, wherein the objective function is $I(\tilde{X};\tilde{Y})$ and is expressed $$I(\tilde{X};\tilde{Y}) = \sum_{\tilde{x} \in \tilde{X}} \sum_{\tilde{y} \in \tilde{Y}} p(\tilde{x},\tilde{y}) \log \frac{p(\tilde{x},\tilde{y})}{p(\tilde{x})p(\tilde{y})},$$

where $\tilde{x}$ and $\tilde{y}$ are clusters according to modalities X and Y, $p(\tilde{x},\tilde{y})$ is a joint probability distribution and $p(\tilde{x})$ and $p(\tilde{y})$ are marginal probability functions based on the clusters.

8. A system for parallel data clustering, comprising:
a) a master processor configured for dividing data with a plurality of modalities expressed therein into clusters, creating cluster pairs from the clusters, and computing an objective function based on an optimization cycle executed on the cluster pairs;
b) an array of slave processors operably connected to the master processor and configured to receive the clusters and execute the optimization cycle on the cluster pairs; and
c) two cluster seats associated with each slave processor, wherein the optimization cycle includes parallel execution by the slave processors of a slave process on each cluster pair so as to increase the objective function, and wherein the array of slave processors is configured to pass clusters of each cluster pair through a plurality of the cluster seats at random or in sequence.

9. The system of claim 8, wherein the slave process comprises exchanging data between the clusters of the cluster pair so as to increase the objective function based on two modalities, and re-sorting the cluster pairs, wherein the slave process is repeated for a plurality of possible cluster pairs.

10. The system of claim 9, wherein the resorting comprises sending one of the clusters of each cluster pair to a cluster seat associated with another slave processor in a predetermined sequence so that all possible cluster pairs are created during the optimization cycle.

11. The system of claim 9, wherein the array of slave processors is configured to pass each cluster through a plurality of the cluster seats at random while insuring that all clusters seats remain occupied by clusters.

12. The system of claim 9, wherein the master processor is configured to repeat the master process for one or more iterations, and the slave processor is configured to use at least one different modality in each iteration.

13. A non-transitory computer-readable medium having embodied therein a computer-readable program code for execution by a computer network including a master processor, an array of slave processors, and two cluster seats are associated with each slave processor, said program code comprising:

a) a master process code section for execution by the master processor, and configured for:
   i) dividing data into clusters;
   ii) sending each cluster to one of the cluster seats; and
   iii) computing an objective function based on an optimization cycle, and
b) a slave process code section for execution by each slave processor, and configured for
   i) exchanging data between the clusters of each associated cluster seat so as to increase the objective function based on two modalities expressed in the data; and
   ii) resorting the clusters among the cluster seats, wherein a cluster of at least one of the cluster pairs is passed to another cluster seat at random or in sequence, and,
wherein the optimization cycle comprises execution of the slave process code by all slave processors in parallel until the exchanging step has been executed on a plurality of cluster pairs.

14. The non-transitory computer-readable medium of claim 13, wherein the resorting comprises sending one of the clusters of each cluster pair to a cluster seat associated with another slave processor in a predetermined sequence so that all possible cluster pairs are created during the optimization cycle.

15. The non-transitory computer-readable medium of claim 13, wherein the slave process code section is configured to pass each cluster through a plurality of the cluster seats at random while insuring that all cluster seats remain occupied by clusters.

16. The non-transitory computer-readable medium of claim 13, wherein the objective function is $I(\tilde{X};\tilde{Y})$ and is expressed $$I(\tilde{X};\tilde{Y}) = \sum_{\tilde{x}\in\tilde{X}} \sum_{\tilde{y}\in\tilde{Y}} p(\tilde{x},\tilde{y}) \log \frac{p(\tilde{x},\tilde{y})}{p(\tilde{x})p(\tilde{y})},$$

where $\tilde{x}$ and $\tilde{y}$ are clusters according to modalities X and Y, $p(\tilde{x},\tilde{y})$ is a joint probability distribution and $p(\tilde{x})$ and $p(\tilde{y})$ are marginal probability functions based on the clusters.

17. The non-transitory computer-readable medium of claim 13, wherein the master process code section is configured to be repeated for one or more iterations, and the slave process code section is configured to use at least one different modality in each iteration.

* * * * *